Patented Dec. 18, 1945

2,391,267

UNITED STATES PATENT OFFICE 2,391,267

AMIDES

William Jennings Peppel, Bellemoor, Del., assignor to E. I. du Pont de Nemours & Company, Wilmington, Del., a corporation of Delaware No Drawing. Application September 18, 1942, Serial No. 458,811

11 Claims. (Cl. 260—402.5)

This invention relates to aliphatic acid amides and more particularly to N,N'-thiobisamides.

The reaction of sulfur monochloride with lower organic acid amides such as butyramide and capramide has been disclosed by Naik et al. (J. Ind. Chem. Soc. 1 28 (1924)) to lead to N,N' diacyl hydrazides. It is therefore surprising that on applying this reagent to higher aliphatic acylamides, i. e., those of at least eight carbons, it is found that N,N'-thiobisamides are formed.

This invention has as an object the provision of a process for preparing higher aliphatic N,N'-thiobisamides. Other objects will appear hereinafter.

These objects are accomplished by the following invention where an amide of a saturated aliphatic monocarboxylic acid of at least eight carbon atoms, having on the amido nitrogen at least one hydrogen atom, is reacted with sulfur monochloride to give the N,N'-monosulfide of the amide.

The best way, as now known, of carrying out the present invention is as follows:

An amide, having hydrogen on the amido nitrogen, of a saturated aliphatic monocarboxylic acid of at least eight carbon atoms and having any remaining valence of the amido nitrogen satisfied by a monovalent saturated hydrocarbon radical, for example lauramide, is placed in a vessel equipped with a stirrer and a vertically attached condenser and covered with an inert solvent, preferably a naphtha fraction boiling at a temperature within the range of 40–60° C. Sulfur monochloride equivalent to a 50–75% excess of the theoretical for reaction of two moles of the amide with one mole of sulfur monochloride is added and the mixture stirred and heated to the temperature at which the solvent boils until the evolution of hydrogen chloride diminishes to a negligible rate. The mixture is allowed to cool and the product collected on a funnel by filtration. It is washed until as free as possible of excess sulfur monochloride using as much additional inert solvent as necessary. The product is freed of retained solvent by drying in the air.

The more detailed practice of the invention is illustrated by the following examples, wherein parts given are by weight. There are of course many forms of the invention other than these specific embodiments.

Example I

One hundred parts of lauramide was added to a mixture of 180 parts of benzene and 1300 parts of petroleum ether (B. P. 40–70° C.) contained in a vessel equipped with a reflux condenser. Fifty parts of sulfur monochloride was added and the mixture heated to the boiling point of the solvent. Heating was continued until after fifteen hours the evolution of hydrogen chloride had completely ceased. After the mixture had cooled to room temperature the product was collected by filtration and washed with 100 parts of petroleum ether. It was then allowed to dry in the air. The product melted at 152–4° C. (uncorrected) and contained 7.5% sulfur and 7.0% nitrogen. The analysis is in essential agreement with the calculated values for N,N'-thiobislauramide, $$(C_{11}H_{23} \cdot CO \cdot NH \cdot)_2 S$$

which contains 7.6% sulfur and 7.0% nitrogen.

Example II

One hundred parts of stearamide was covered with 1500 parts of petroleum ether solvent and 35 parts of sulfur monochloride added to the mixture. The mixture was heated under reflux for five hours. The product was slowly precipitated from the solvent during the period of heating. After cooling the product was collected on a funnel by suction and washed with about 400 parts of petroleum ether. To free it completely of excess sulfur chloride it was necessary to digest the product with 300 parts of benzene heated to 50–60° C. After cooling, collecting, and washing, the product was allowed to dry in the air at room temperature. In this manner 60 parts of a product melting at 147–148° C. was obtained. It contained 5.3% sulfur and 4.7% nitrogen. The calculated values for N,N'-thiobisstearamide, $$(C_{17}H_{35} \cdot CO \cdot NH \cdot)_2 S$$

are 5.3% sulfur and 4.7% nitrogen.

Example III

One hundred parts of caprylamide was covered with 1000 parts of petroleum ether contained in a vessel equipped with a reflux condenser and a stirrer. Forty-five parts of sulfur monochloride was added and the mixture stirred and heated under reflux for fifteen hours. The mixture was cooled and the crystalline product collected on a funnel and washed with benzene until the odor of sulfur monochloride could no longer be detected. Ninety-six parts of a product melting at 147–9° C. was obtained. It contained 10.1% sulfur and 8.8% nitrogen. The calculated values for N,N'- thiobiscaprylamide, $(C_7H_{15} \cdot CO \cdot NH \cdot)_2S$, are 10.1% sulfur and 8.5% nitrogen.

Example IV

One hundred parts of N-lauryllauramide and fifty parts of sulfur monochloride were added in this order to 600 parts of petroleum ether (B. P. 40–70° C.) contained in a vessel equipped for stirring while heating under reflux and provided with means for venting the evolved hydrogen chloride. The mixture was heated until the solvent boiled and then stirred for sixteen hours. As the reaction proceeded hydrogen chloride was evolved, and the product separated as an oil. The mixture was cooled, the upper layer of solvent and excess sulfur monochloride decanted and the viscous product extracted with hot 95% ethanol to extract impurities, leaving the product, $(C_{11}H_{23} \cdot CO \cdot NC_{12}H_{25} \cdot)_2S$, as a viscous oil.

The process of this invention is applicable to any amide of a saturated aliphatic (including cycloaliphatic) monocarboxylic acid of at least eight carbon atoms, having the carbonamide group attached to a monovalent hydrocarbon radical, and having at least one hydrogen on the amido nitrogen, any remaining valences of which are satisfied by monovalent saturated aliphatic (including cycloaliphatic) hydrocarbon radicals. Thus, it is applicable to the isomeric caprylamides and higher homologues, e. g. n-caprylamide, N-ethyl-n-caproamide, di-propylacetamide, pelargonamide, methylhexylacetamide, capramide, lauramide, palmitamide and stearamide, and to saturated cycloaliphatic monoacylamides containing the cyclopropane, cyclobutane, cyclopentane, cyclohexane and/or cycloheptane rings and having in the aggregate at least eight carbon atoms, e. g. β-cyclopentylpropionamide, cyclohexylacetamide, β-cyclohexylpropionamide, cycloheptylacetamide, etc. Cycloaliphatic compounds occur widely in nature in various plant products and in crude petroleums. From the latter, complex mixtures of so-called naphthenic acids convertible to suitable amides are obtainable. Other cycloaliphatic amides can be obtained by conventional methods from naturally-occurring cycloaliphatic compounds such as the terpenes. Another and numerous class of amides adapted for the process of this invention can be obtained by reacting saturated aliphatic or cycloaliphatic monobasic acids or suitable derivatives containing at least eight carbon atoms with primary saturated aliphatic or cycloaliphatic amines. For example, N-methylcaprylamide and N-cyclohexylcaprylamide may be obtained by reaction of caprylic acid, caprylic anhydride, caprylyl chloride or bromide with methylamine and cyclohexylamine.

The reaction of sulfur monochloride with the above amides is preferably carried out in an anhydrous organic solvent inert to the sulfur monochloride and the amide, since the reaction proceeds more smoothly under these conditions, but the use of a solvent for this action is not essential. In the foregoing examples, the amides were only sparingly soluble in the solvent employed but suspensions were satisfactory, the amide dissolving as the reaction progressed. The amount of solvent or suspending liquid to be used is governed by considerations such as the ease with which the reaction can be controlled, the solubility of the amide in the solvent and the physical nature of the suspension. This is preferably determined by trial in each case and will be apparent to those skilled in the art.

It is sufficient to react the amide with only the amount of sulfur monochloride theoretically required for formation of the N,N′-thiobisamide, but an excess of the sulfur monochloride does no apparent harm and can be subsequently removed without difficulty. If a suspension of the amide is employed, an excess of sulfur monochloride may be used to advantage to hasten completion of the reaction.

The reaction of the sulfur monochloride with the amide is preferably carried out at a temperature in the range between 40–60° C., since a considerably increased rate of reaction is obtained with the least harm resulting from secondary reactions. It is to be understood, however, that some latitude in the temperature range is possible and the most suitable temperature can only be determined by trial for each case. In general, the limiting upper temperature will be that at which appreciable darkening in color occurs.

Solvents should be substantially anhydrous, preferably containing less than 1% of water. Suitable solvents are petroleum ether, benzene and ethylene dichloride. The time of reaction varies but is determined by the evolution of hydrogen chloride which finally diminishes to a negligible rate.

The thiobisamides obtainable are wax-like solids and generally colorless. Not only are they higher melting than the amides from which they are derived, but they are much less soluble in solvents such as alcohols or hydrocarbons.

The long-chain N,N′-thiobisamides obtainable by the process of this invention are adapted for use in wax formulations and are useful intermediates for the synthesis of wetting agents and water-repellants.

The above description and examples are intended to be illustratively only. Any modification of or variation therefrom which conforms to the spirit of the invention is intended to be included within the scope of the claims.

What is claimed is:

1. Process of preparing thiobisamides which comprises bringing sulfur monochloride in contact, at 40–60° C. under anhydrous conditions and in an inert organic solvent, with the primary amide of a saturated aliphatic monocarboxylic acid of at least eight carbon atoms, said acid having the carboxyl attached to a monovalent hydrocarbon radical.

2. Process of preparing thiobisamides which comprises bringing sulfur monochloride in contact, at 40–60° C. under anhydrous conditions and in an inert organic solvent, with the primary amide of a saturated open chain aliphatic monocarboxylic acid of at least eight carbon atoms wherein the carboxyl is attached to a monovalent hydrocarbon radical.

3. Process of preparing thiobisamides which comprises bringing sulfur monochloride in contact, at 40–60° C. under anhydrous conditions and in an inert organic solvent, with a saturated fatty acid primary amide of at least eight carbon atoms.

4. Process of preparing thiobisamides which comprises bringing sulfur monochloride in contact, at 40–60° C. under anhydrous conditions and in an inert organic solvent, with the primary amide of a saturated fatty acid of eight carbon atoms.

5. Process of preparing N,N′-thiobiscaprylamide which comprises bringing sulfur monochloride in contact, at 40–60° C. under anhydrous conditions and in an inert organic solvent, with n-caprylamide.

6. Process of preparing N,N'-thiobisstearamide which comprises bringing sulfur monochloride in contact, at 40–60° C. under anhydrous conditions and in an inert organic solvent, with stearamide.

7. N,N'-Thiobiscaprylamide.

8. N,N'-Thiobisstearamide.

9. An N,N'-thiobisamide of the formula

RCO—NH—S—NH—COR wherein RCO is the acyl radical of a saturated fatty acid of at least eight carbon atoms.

10. An N,N'-thiobisamide of the formula

RCO—NH—S—NH—COR wherein RCO is the acyl radical of a saturated open chain aliphatic monocarboxylic acid of at least eight carbon atoms.

11. An N,N'-thiobisamide of the formula

RCO—NH—S—NH—COR wherein RCO is the acyl radical of a saturated aliphatic monocarboxylic acid of at least eight carbon atoms.

WILLIAM JENNINGS PEPPEL.